United States Patent
Williams et al.

(10) Patent No.: US 11,398,977 B2
(45) Date of Patent: Jul. 26, 2022

(54) PACKET CLASSIFIER

(71) Applicant: Metaswitch Networks Ltd., Enfield (GB)

(72) Inventors: Matthew Ian Ronald Williams, Enfield (GB); Michael Jeffrey Evans, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 198 days.

(21) Appl. No.: 16/749,881

(22) Filed: Jan. 22, 2020

(65) Prior Publication Data

US 2020/0267077 A1 Aug. 20, 2020

(51) Int. Cl.
*H04L 45/302* (2022.01)
*H04L 45/74* (2022.01)
*H04L 43/0817* (2022.01)
*H04L 69/22* (2022.01)
*H04L 47/2441* (2022.01)

(52) U.S. Cl.
CPC ........ *H04L 45/302* (2013.01); *H04L 43/0817* (2013.01); *H04L 45/74* (2013.01); *H04L 47/2441* (2013.01); *H04L 69/22* (2013.01)

(58) Field of Classification Search
CPC ... H04L 45/302; H04L 45/74; H04L 43/0817; H04L 43/028; H04L 69/22; H04L 47/2441
See application file for complete search history.

(56) References Cited

U.S. PATENT DOCUMENTS

| | | | |
|---|---|---|---|
| 6,970,462 B1 | 11/2005 | McRae | |
| 9,154,418 B1 * | 10/2015 | Ben-Mayor | H04L 29/0653 |
| 2007/0008888 A1 * | 1/2007 | Chawla | C07C 51/60 370/230 |
| 2016/0359740 A1 * | 12/2016 | Parandehgheibi | H04W 84/18 |
| 2020/0059992 A1 * | 2/2020 | Skog | H04L 67/14 |
| 2020/0267085 A1 * | 8/2020 | Nie | H04L 47/24 |
| 2020/0396779 A1 * | 12/2020 | Yang | H04W 76/11 |
| 2021/0289566 A1 * | 9/2021 | Jimenez Cordon | H04L 63/1458 |
| 2021/0297535 A1 * | 9/2021 | Puente Pestana | H04M 15/852 |

OTHER PUBLICATIONS

"Pankaj Gupta and Nick McKeown: ""Algorithms for Packet Classification"""; Computer Systems Laboratory, Stanford University. http://yuba.stanford.edu/~nickm/papers/classification_tutorial_01. pdf ".
Combined Search and Examination Report dated Jul. 18, 2019 for UK Application No. GB1901071.9.
No Further Objections dated Nov. 27, 2019 for UK Application No. GB1901071.9.
Lakshman et al: High-Speed Policy-Based Packet Forwarding Using Efficient Multi-dimensional Range Matching, ACM SIGCOMM 98, 1998.

* cited by examiner

*Primary Examiner* — Habte Mered
(74) *Attorney, Agent, or Firm* — Han Gim; Newport IP, LLC

(57) ABSTRACT

A packet classifier and methods of processing data packets in a data communications network can include receiving a data packet comprising packet header data; performing rule-based classification of the received data packet to generate rule-based classification data; and processing the data packet in accordance with the rule-based classification data.

20 Claims, 5 Drawing Sheets

PACKET CLASSIFIER

CROSS-REFERENCE TO RELATED APPLICATIONS

This application claims priority to United Kingdom Application No. GB 1901071.9, filed Jan. 25, 2019, under 35 U.S.C. § 119(a). The above-referenced patent application is incorporated by reference in its entirety.

BACKGROUND OF THE INVENTION

Field of the Invention

The present invention relates to a method and system for packet classification, and has particular applicability to high-throughput packet processing in data communications networks.

Description of the Related Technology

There has been an increasing drive towards a flexible, response-based approach to controlling traffic flows within a network or the Internet. In response to this demand a technology known as the Software-Defined Network (SDN) has been developed. An SDN separates the data and control functions of networking devices, such as routers, switches, gateways and mobility entities. In general, an SDN comprises a controller in the control plane which can perform various complex functions, including routing, naming, policy declaration, access and security checks. The controller may define the packet flows that occur in the data plane, computing a route for a packet flow to take.

In order to meet the increasing demand for granular capacity or application-driven, instantiation and up/down-scaling in mobile networks, there has been a drive to implement user plane components as a pure cloud native network function using modern microservices methodologies that are deployable within a serverless framework. In order to achieve high packet throughputs with complex pipelines and low latencies, such components have historically been realized using dedicated hardware and custom silicon. However, this is inflexible and not suitable to the increasingly varied packet handling requirements.

As an example, the User Plane Function UPF in a 5G network applies various Policy and Charging Control (PCC) rules to the data packets as they are forwarded upstream and downstream. This includes using Packet Detection Rules (PDRs) that are expressly configured or determined dynamically by the control plane to identify flows, and then apply special treatment to those flows (such as dropping the packets in the flow, steering them to a service function chain, applying specific QoS treatment, or differential usage reporting/charging). A problem with PDRs is that they can be overlapping, and often are expressed in terms of ranges of values, which natively cannot be expressed succinctly as bit masks or prefixes.

Conventional methods of implementing PDRs involve transforming them into a tree-structure classifier, in which the tree-structure classifier includes classifier nodes at different sequential levels which look at the various fields in the packet in turn. There are various ways to optimize these tree-structure classifiers, but transformation/optimization is potentially computationally intensive so may result in capacity issues or unacceptable latency setting up sessions and is in any event still likely to result in each packet having to pass through several classifier nodes in sequence.

The paper "High-Speed Policy-Based Packet Forwarding Using Efficient Multi-dimensional Range Matching", Lakshman and Stiliadis, ACM SIGCOMM 98, proposes the use of bit-level parallelism to accelerate a packet filtering operation. It is assumed that a set of filtering rules are changed very infrequently, and hence uses extra pre-processing to speed up searches, and exhibits a quadratic increase in storage space with respect to the number of rules in a set. The proposed system is fast but at the expense of occupancy, i.e. the amount of working memory used for each set of rules, the setup latency and the cache efficiency. It is impractical for use with systems like the User Plane Function UPF in a 5G network, which use separate classifiers for each packet session being processed.

There is a need for improved packet processing techniques, in particular for use in the User Plane Function UPF in a 5G network and other similar systems.

SUMMARY

According to aspects of the present disclosure, there is provided a method of, computer software and a system for processing data packets in a data communications network.

In one example the method comprises: receiving a data packet comprising packet header data; performing rule-based classification of the received data packet to generate rule-based classification data; and processing the data packet in accordance with the rule-based classification data. Performing the rule-based classification comprises: obtaining feature definition data representative of a plurality of packet header features; performing a first comparison, the first comparison comprising comparing the header data of the received data packet with said feature definition data; generating a first data unit comprising a plurality of first data elements derived from the first comparison, each first data element indicating the presence or absence of a packet header feature in said plurality of packet header features; obtaining packet detection data, the packet detection data including a second data unit comprising a plurality of second data elements, the second data unit being representative of a packet detection rule; performing a second comparison, the second comparison comprising comparing the first data unit with the packet detection data; and generating the rule-based classification data on the basis of a result of the second comparison.

The feature definition data may be derived from packet detection rules, corresponding to the packet detection data, by identifying individual features in each of the packet detection rules. In cases where a feature corresponds to a rule condition, this enables determination of a maximum and a minimum for each range described in the rule condition. In some arrangements performing the first comparison involves extracting a value from a field of the packet header data, duplicating the value into one register of a processor, loading at least part of the feature definition data as a vector into another register of the processor, and performing at least part of the first comparison between the one register and the other register.

In some embodiments the packet detection data includes a third data unit comprising a plurality of third data elements, the third data unit being representative of a further packet detection rule, and the second comparison involves duplicating the first data unit into one register of a processor, loading the second and third data units into another register of the processor as a vector, and performing the second comparison between the one register and the other register. In other embodiments the packet detection data includes a fourth data unit comprising a plurality of fourth data elements, the fourth data unit being representative of a yet further packet detection rule, and performing the second comparison comprises comparing a duplicated set of the first data unit with a first vector comprising the second and third data units, and the fourth data unit is not included in the first vector. By loading the respective data units into a register as a vector this enables vector based processing of the second comparison, which effectively parallelises and thus increases the speed of the second comparison.

Advantageously, the second, third and fourth data units are associated with priority data indicative of priorities attached to each respective packet detection rule, and placement of the second and third data units into the first vector is determined according to the priority data. In this example the second and third data units are in a set, the set being arranged as the first vector. Since these sets of data units are processed in sequence, one vector after another, and in priority order, this ensures that a data unit representing a packet detection rule of a higher priority, for example PDR1, is compared with the first data unit of the data packet, before a packet detection rule of a lower priority that is in a different set, for example PDR3, and so on. Processing of the sets of data units can be interrupted once a highest-match packet detection rule has been identified, thereby significantly increasing the speed of processing of data packets.

Preferably the method comprises performing session-based classification of the received data packet to generate session classification data and obtaining the packet detection data used in the rule-based classification on the basis of the session classification data. The session-based classification can involve obtaining session detection data representative of a plurality of sessions; loading the session detection data into a tree-structure classifier; and performing classification of session identifier data in the packet header data using the tree-structure classifier to generate the session classification data. This aspect therefore involves an initial step of session-based classification of the received data packet, which may be used to identify a session, and then to select packet detection rules (e.g. as a set of PDRs) associated with the identified session. A session may be identified on the basis of a specific user identifier, for example single IP address or a single Fully Qualified Tunnel Endpoint Identifier of a of a GTP-u tunnel (F-TEIDu) in a packet header.

Techniques for processing data packets for which embodiments described herein are suitable include (but are not limited to): dropping the received data packet, routing the received data packet to a selected service function processor, applying a selected Quality of Service (QoS) treatment to the received data packet; and performing a selected differential usage reporting and/or charging function with respect to the received data packet.

In some implementations the method may be executed in a packet forwarding engine such as is utilized in a User Plane Function (UPF) in the data communications network.

In accordance with further aspects of the present disclosure there is provided computer software in the form of executable instructions, which, when executed, perform the methods described above. Also provided is a system for processing data packets, configured with the above-described functionality.

Further aspects and advantages of the disclosure will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
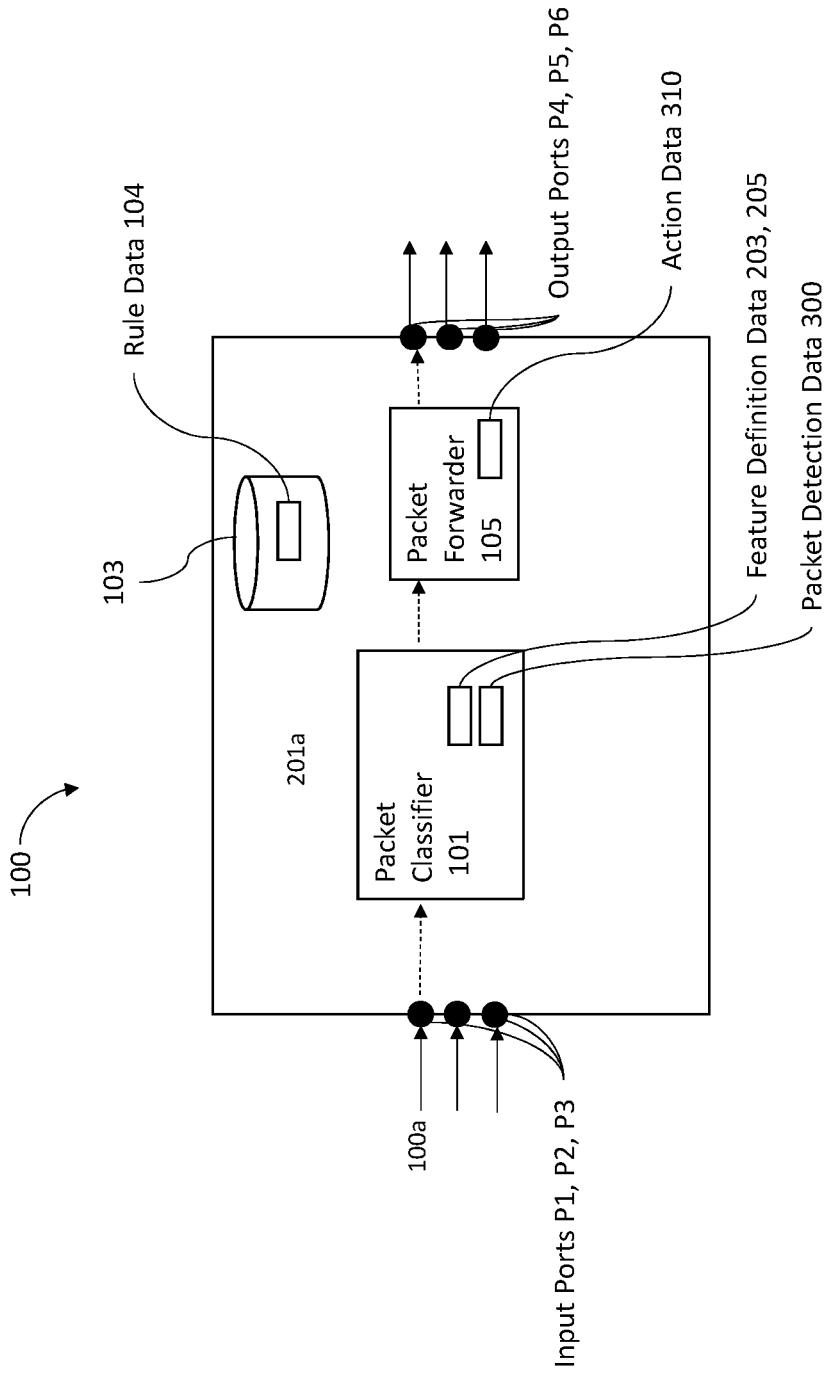
FIG. 1 is a schematic diagram showing a system according to an example.

Examples described herein are concerned with a method of and system for processing data packets in a data communications network. Referring to FIG. 1, a packet forwarding node 100 comprises a rule-based packet classifier 101, which is implemented in software and executes on a data processor. The data processor in this example is a general purpose data processor such as a CPU, having data storage in the form of hardware registers, referred to herein as registers, for use during data processing. The data processor is programmed, using computer software configured to implement the rule-based classifier 101, to carry out parallelised data processing operations. In these parallelised data processing operations, comparisons between data during classification of a packet are performed using vector data processing techniques, as will be described in further detail below. In examples, the data processor is an Intel™ AVX2-capable processor, the registers include 256-bit registers, and the instructions which the rule-based classifier executes include 256-bit register instructions.

The data processor may execute more than one rule-based packet classifier 101, depending on the volume of data traffic to be classified. Rule-based packet classifiers 101 of the packet forwarding node 100 may be distributed across more than one data processor, which may be configured as a virtualised computing hardware platform, such as Openstack™.

The packet forwarding node 100 comprises one or more input ports P1, P2, P3 for receiving traffic data packets and control data packets. The packet classifier 101 has access to storage 103 which holds packet forwarding rules, which may be in the form of Packet Detection Rules (PDRs), Forwarding Action Rules (FARs), Buffering Action Rules (BARs), QoS Enforcement Rules (QERs) and/or Usage Reporting Rules (URRs), generally indicated as rule data 104 in FIG. 1. The rule data 104 determine how packets are to be classified and how the classified packets are to be handled, as will be described in more detail below. Traffic data packets which are determined to be routed further are forwarded via one or more output ports P4, P5, P6. Control data packets destined for the packet forwarding node 100 are processed internally within the packet forwarding node 100.

The packet classifier 101 may be configured with feature definition data 203, 205 that is representative of a plurality of packet header features, each of which corresponds to an individual packet header field of a data packet. The packet classifier 101 may be configured with packet detection data 300 that define how data packets are identified. Both the feature definition data 203 and the packet detection data 300 may be derived from the rule data 104, using predetermined mapping functions.

As is known in the art, PDRs can be expressed as a series of conditions each relating to a header field of a data packet header. The feature definition data may be derived from PDRs in a set of PDRs in the rule data 104 by inspecting each rule in turn, identifying each individual feature in each of the rules, each feature corresponding to a rule condition, and determining a maximum and a minimum for each range described in the rule condition. The same packet header field may be referenced in two or more rules of the rule data, and translated into different features, depending on the ranges referenced in each rule. If identical ranges relating to identical packet header fields are referenced in one set of rules, these may be mapped to a single feature, expressed in terms of its respective maximum and minimum values, in the feature definition data. Each respective feature in the feature definition data is mapped to a given bit position in a bit mask representative of the entire set of features in a set of rules.

The packet detection data 300 may be derived from the individual PDRs in a set of PDRs in the rule data 104, each expressed as a bit mask which is representative of the presence or absence of a feature, of the entire set of features, in the individual rule.

According to examples described herein, the packet classifier 101 executes optimized instructions using registers of the data processor in order to effect computationally efficient comparisons between header data of incoming packets and the feature definition data and the packet detection data 300, as will now be explained.

The packet classifier 101 is configured to receive a data packet 102a comprising packet header data 201a via one of the input ports P1, and upon receipt thereof, to perform a first comparison. This first comparison comprises comparing the header data 201a of the received data packet with feature definition data 203, 205. In examples described herein, the feature definition data corresponds directly to header fields of the data packet, so e.g. a source and/or destination IP address field, a DSCP field, a destination port field, etc. As mentioned above, in some examples the feature definition data is expressed in the form of ranges, each of which has a minimum value for the range and a maximum value for the range. The features may be grouped into feature types, each corresponding to a different packet header field, which may be processed in parallel when performing a first phase of packet classification.

Figure 2:
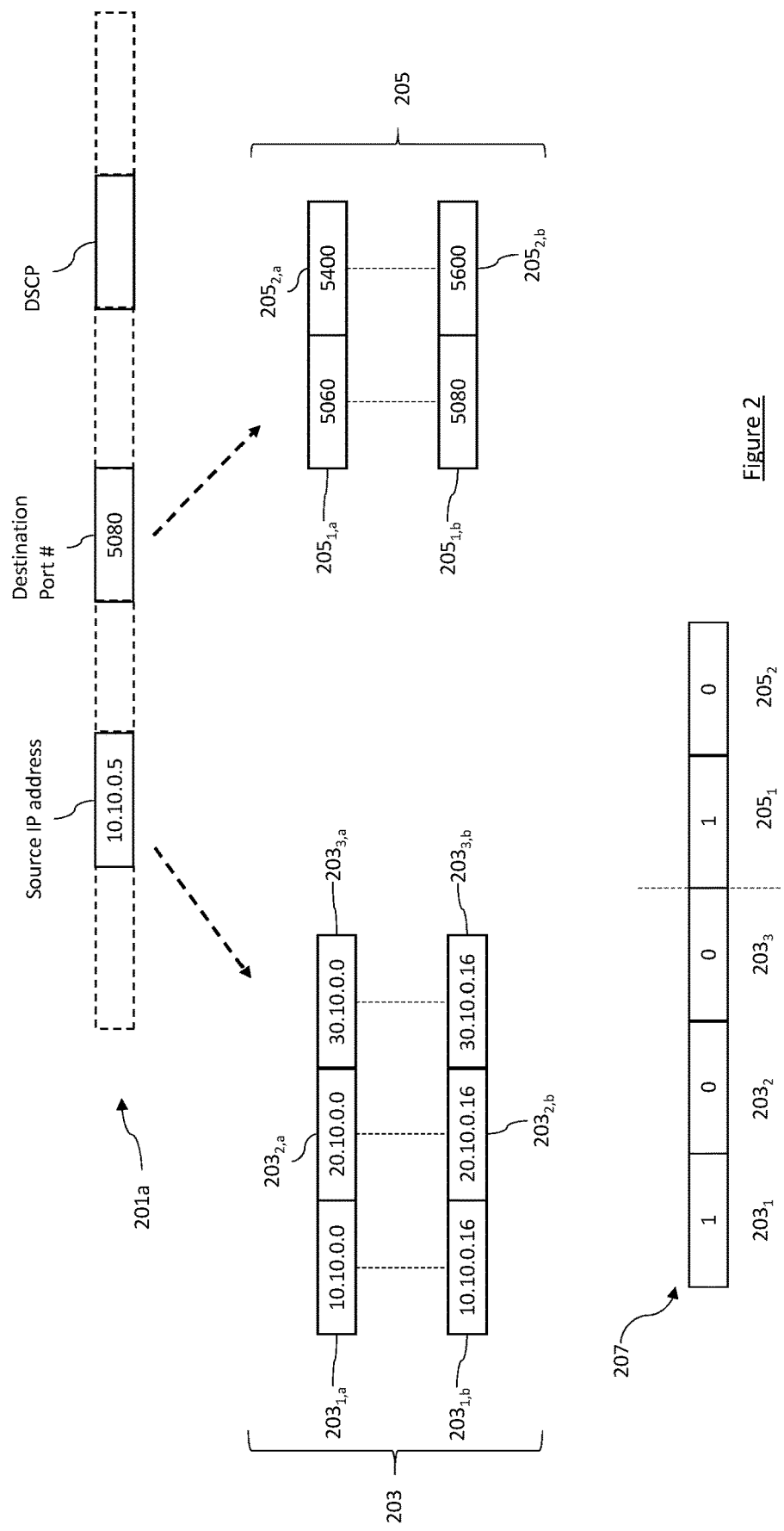
FIG. 2 is a schematic diagram showing representations of packet header data and feature definition data undergoing manipulation according to an example.

FIG. 2 shows an example of processing in the first phase of packet classification. Table 1 shows exemplary values for PDR1-PDR3 stored in rule data 105, in which the PDRs contain source IP address conditions and destination port conditions as exemplary conditions (C1.1, C1.2 etc.):

TABLE 1

| PDR1 | C1.1 Source IP address of a packet to be within subnet 20.10.0.0/16 |
| | C1.2 Destination Port to be in the range 5060:5080 |
| PDR2 | C2.1 Source IP address of a packet to be within subnet 30.10.0.0/16 |
| | C2.2 Destination Port to be in the range 5400:5600 |
| PDR3 | C3.1 Source IP address of a packet to be within subnet 10.10.0.0/16 |
| | C3.2 Destination Port to be in the range 5060:5080 |

As mentioned above, the feature definition data may be derived from the entire set of PDRs. In the example shown, there are three features of a first feature type 203 in the feature definition data, these being source IP address ranges. Each range can be represented by a set of minimum values $203_{1,a}$, $203_{2,a}$, $203_{3,a}$ and a set of maximum values $203_{1,b}$, $203_{2,b}$, $203_{3,b}$. The source IP address of the received packet header data 201a may be duplicated and loaded as a vector into a register of the data processor conducting classification. A set of minimum values in the feature data of the IP source address type can be loaded into another register as a vector, and the copies of the source IP address of the received packet header data 201a may compared to the set of minimum values—by way of a greater than operand—in a single instruction and single clock cycle of the data processor. Next, a set of maximum values in the feature data of the IP source address type can be loaded into the other register as a vector, and the copies of the source IP address of the received packet header data 201a may compared to the set of maximum values—by way of a smaller than operand—in a single instruction and single clock cycle of the data processor. A bitwise AND operation of the outputs of the comparisons is then performed in order to combine the output of the maximum and minimum range comparisons.

In this way the packet classifier 101 can efficiently identify which of the features of the IP source address type characterises the source IP address of the received packet. This can be repeated for the other feature types, each corresponding to different fields of the packet header. In the example shown, there are two features of a second feature type 205 in the feature definition data, these being destination port number ranges, with a set of minimum values $205_{1,a}$, $205_{2,a}$, and maximum values $205_{1,b}$, $205_{2,b}$.

Referring still to FIG. 2, the output of the feature comparison operations is a first data unit 207 comprising a plurality of first data elements, each first data element indicating the presence or absence of a packet header feature in the entire set of packet header features in a PDR set currently being processed. In the example it can be seen that for source IP address type 203 and destination port type 205, the first data unit 207 is a feature bit mask with bits set for elements $203_1$ and $205_1$, identifying that the source IP address and destination port number for the received data packet 102a corresponds to ranges 10.10.0.0/16 and 5060: 5080 respectively.

While the above example concentrates on two header fields (source IP address and destination port) it will be appreciated that the packet classifier 101 can generate a bit mask representation of the presence/absence of any number of instances of header data—expressed as ranges, as described above, or as discrete values—and for a configurable number of header fields.

Figure 3:
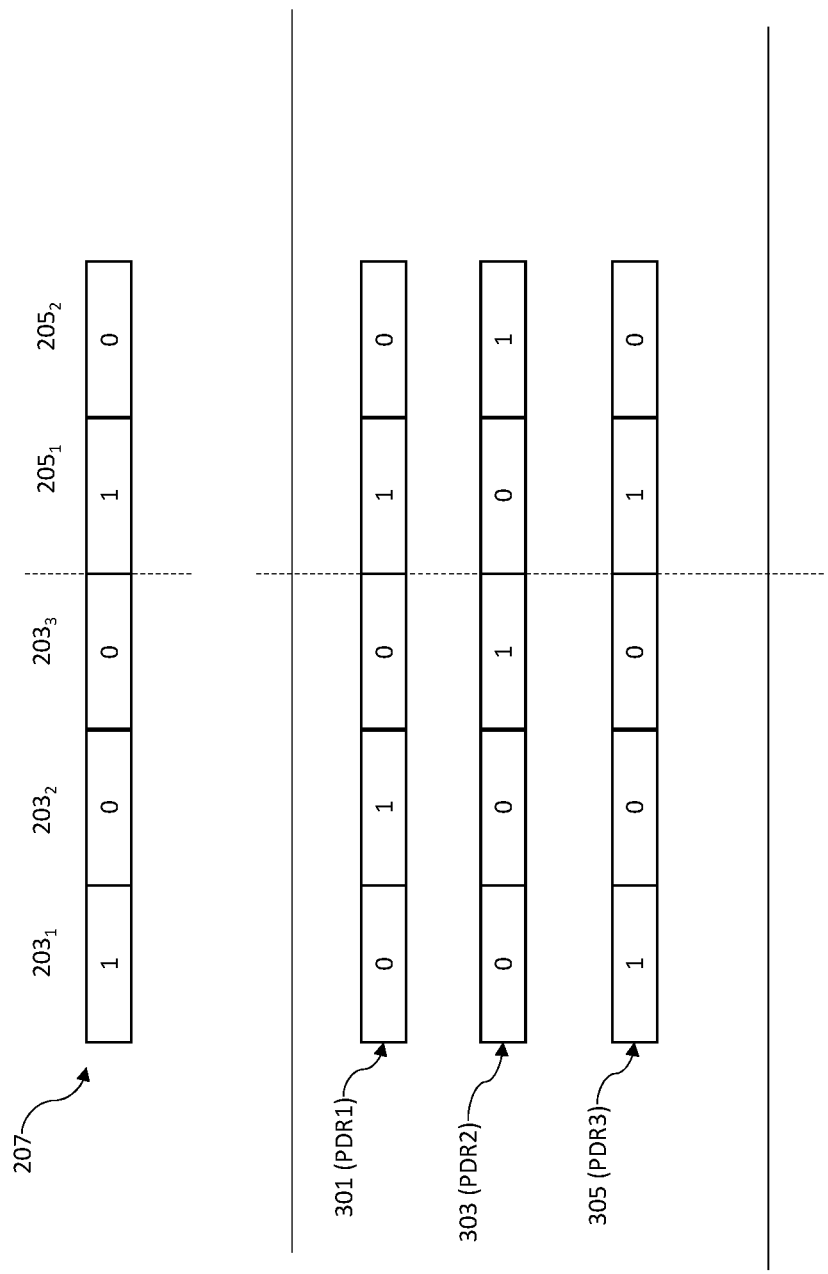
FIG. 3 is a schematic diagram showing representations of an output of the manipulations of FIG. 2 combined with packet detection data according to an example.

FIG. 3 is a schematic diagram showing an example of processing in a second phase of packet classification. The packet classifier 101 compares the feature bit mask 207 generated in the first phase with packet detection data 300, for the purpose of identifying which rule is most applicable to data packet 102a. The packet detection data 300 is in the form of data units which are bit mask representations of features in packet detection rules (PDRs) stored in the rule data 104. The packet detection data 300 may be derived from the individual PDRs in a set of PDRs in the rule data 104

FIG. 3 shows the first data unit 207 of FIG. 2 and second, third and fourth data units 301, 303, 305 which are bit mask representations of the features in the three exemplary packet detection rules PDR1-PDR3.

In one implementation the packet classifier 101 compares the first data unit 207 with a bit mask of PDR1 301 by loading the first data unit 207 into one register of a processor, loading the second data unit 301 into another register of the processor and performing a bitwise match operation between corresponding fields thereof. The match operation detects a match between the second data unit 301 and any bit(s) the first data unit 207 which indicate the presence of a feature in the data packet being forwarded, and ignores any bit(s) in the first data unit 207 which represent absence of a feature in the data packet being forwarded. When there is more than one PDR, as is the case with the example shown in FIG. 3, the packet classifier 101 compares the first data unit 207 with each of the available data units representing PDRs, here PDR1, PDR2 and PDR3. In this case the packet classifier 101 duplicates and loads the first data unit 207 as a vector into one register of the data processor, loads the second, third and fourth data units into another register as a vector, and performs a bitwise AND operation between each respective copy of the first data unit 207 and the second, third and fourth data unit 301, 302, 303. In this way the packet classifier 101 parallelises the comparison of the first data unit 207 with the second, third and fourth data unit 301, 302, 303. The output of the comparison with PDR1-PDR3 is added to the data packet as a label, indicating that data packet 102a has a match with PDR3, and passed on to the packet forwarder 105. The packet forwarder 105 applies one or more actions associated with PDR3 in action data 310.

Where more data units derived from the PDRs are to be applied to the data packet 102a than can be held within a single register of the data processor, the data units may be placed into sets of data units and processed in sequence in the second phase. In this example, a first set of data units, including at least the second and third data unit, may be loaded into a register as a first vector, and a bitwise AND operation between each respective copy of the first data unit 207 and the first set of data units is performed in a single instruction and single clock cycle of the data processor. Note that the fourth data unit is not included in the first set. Next, a second set of the data units, including at least the fourth data unit, may be loaded into a register as a second vector, and a bitwise AND operation between each respective copy of the first data unit 207 and the fourth data unit 303 is performed in a single instruction and single clock cycle of the data processor.

Preferably each of data units derived from the PDRs being processed are associated with priority data indicative of priorities attached to each respective packet detection rule PDR1-PDR3, and placement of the data units into sets of data units being processed in sequence is determined according to the priority data. In this example the second third and fourth data units are placed into the first and second sets of data units, respectively, according to the priority data, with PDR1 and PDR2 being of higher priority than PDR3. Since a register is limited in size, and the sets of data units are processed in sequence, this ensures that a data unit representing a PDR of a higher priority, for example PDR1, is compared with the first data unit 207 of the data packet 102a, before a PDR of a lower priority, for example PDR3, and so on. Processing of the sets of data units can be interrupted once a highest-match PDR has been identified, thereby significantly increasing the speed of processing of data packets by the packet classifier 101.

The sets of PDRs may be stored in the storage 103, as part of rule data 104 (as noted above), and in association with session identification data. An initial step of session-based classification of the received data packet may be used to identify a session, and then to select a set of PDRs associated with the identified session. A separate session-based packet classifier (not shown) may be used. A session may be identified on the basis of a specific user identifier, for example single IP address or a single Fully Qualified Tunnel Endpoint Identifier of a of a GTP-u tunnel (F-TEIDu) in a packet header. A one-to-one classification for session identification may not be most efficiently handled by the rule-based classifier. It may be handled by creating, in the feature definition data described above, a feature for each specific user identifier. However, that may result in a very large feature bit mask, when a significant number of session are being processed. In this example, a separate classifier of a different type is used for the session-based classification. A tree-structure classifier of a known type may be used. The tree-structure may be loaded with session detection data representative of a plurality of session identities, e.g. source or destination IP addresses, or F-TEIDu's, associated with each respective session context. When processing a packet, packet header data of the relevant type, e.g. a source or destination IP address, or a F-TEIDu, may be extracted from the packet header and passed through the tree-structure to classify the packet using an exact match and thereby to identify the session. A suitable tree-structure classifier may be of a known type, such as a decision-tree classifier. Alternatively, a packet processing graph structure of the form described in Applicant's co-pending application GB 1813199.5 may be used as the tree-structure classifier.

As mentioned, the tree-structure classifier is used to perform an exact-match classification of a session identifier in the packet header to generate the session classification data, which is then passed to the rule-based classifier 101. Having identified or received the session classification data from the session-based classifier, the rule-based packet classifier 101 may use this to query the storage 103 and retrieve a set of PDRs corresponding to this classification, for use in the rule-based classification steps described above.

Once a highest-priority match PDR has been identified for the data packet 102a, the packet can then be processed in accordance with action data 310, which may label the packet in accordance with its rule-based classification to cause one or more of the following actions before the data packet is forwarded:

dropping the received data packet 102a;
routing the received data packet 102a to a selected service function processor;
applying a selected Quality of Service (QoS) treatment to the received data packet 102a; and
performing a selected differential usage reporting and/or charging function with respect to the received data packet 102a.

Examples are particularly well suited to data driven programming and service-based ecosystems, in which, as described in the background section, processing of control plane data and user plane data are logically and physically separated. Generally, the user plane component determines what to do with packets arriving on its inbound ports and can be considered a rule-based programmable switch. From the point of view of the user plane component a flow is a sequence of packets that matches a specific set, or range, of header field values.

In examples, a rule-based classifier is implemented in a user plane component of a data communications network. The user plane component can be any of a Packet Data Gateway PGW-U or a Serving Gateway SGW-U in LTE Evolved Packet Core networks, and a User Plane Function UPF in 5G networks. The user plane component performs packet forwarding under the control of a corresponding control plane component, which in the case of LTE Evolved Packet Core networks may be a Mobility Management Entity MME or Serving Gateway-C, and in the case of 5G networks may be a Service Management Function SMF.

Figure 4:
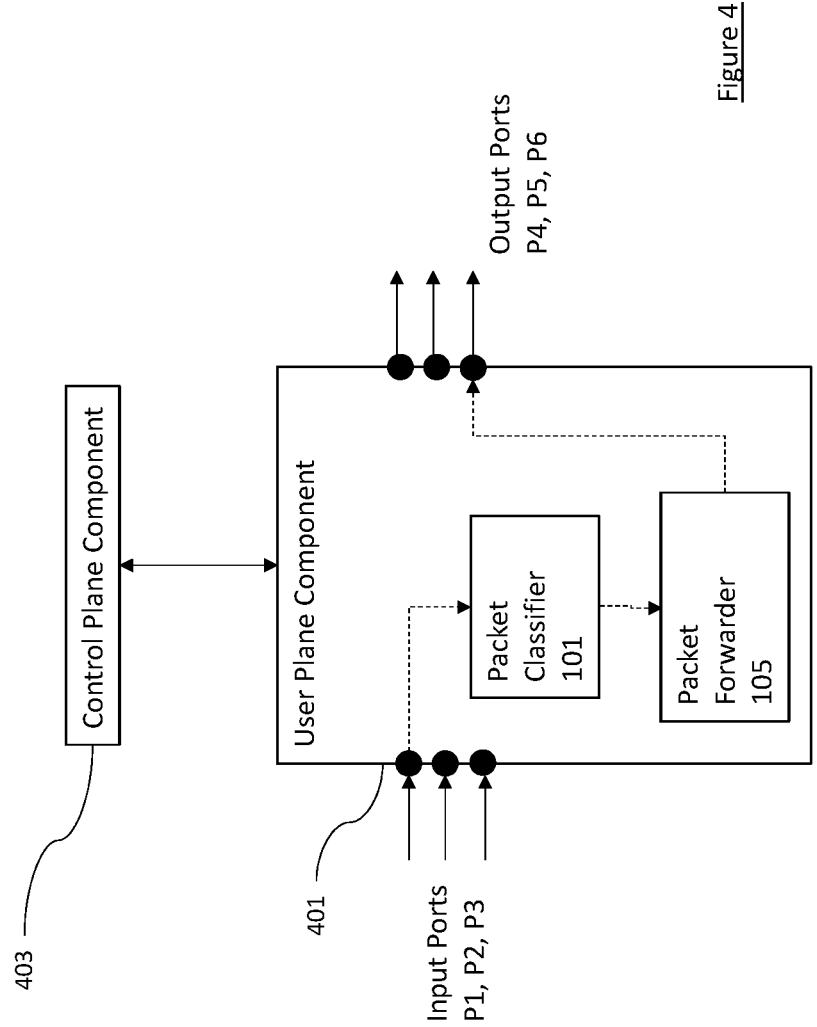
FIG. 4 is a schematic diagram showing the system of FIG. 1 implemented in an exemplary user plane component.

FIG. 4 illustrates an example in which a first network node 401, in this example a 5G UPF, may identify user plane traffic flows based on control information received from a second network node 403, in this example a 5G SMF over a control interface, in this example an N4 interface as described in "Interface between the Control Plane and the User Plane nodes" (3GPP TS 29.244 version 15.2.0 Release 15.) The N4 interface employs the Packet Forwarding Control Protocol (PFCP), which was originally defined within 3GPP TS 29.244 for use on Sx reference points in support of Control and User Plane Separation (CUPS). PFCP is similar to OpenFlow and has particular functionality designed to support mobile access networks.

Figure 5:
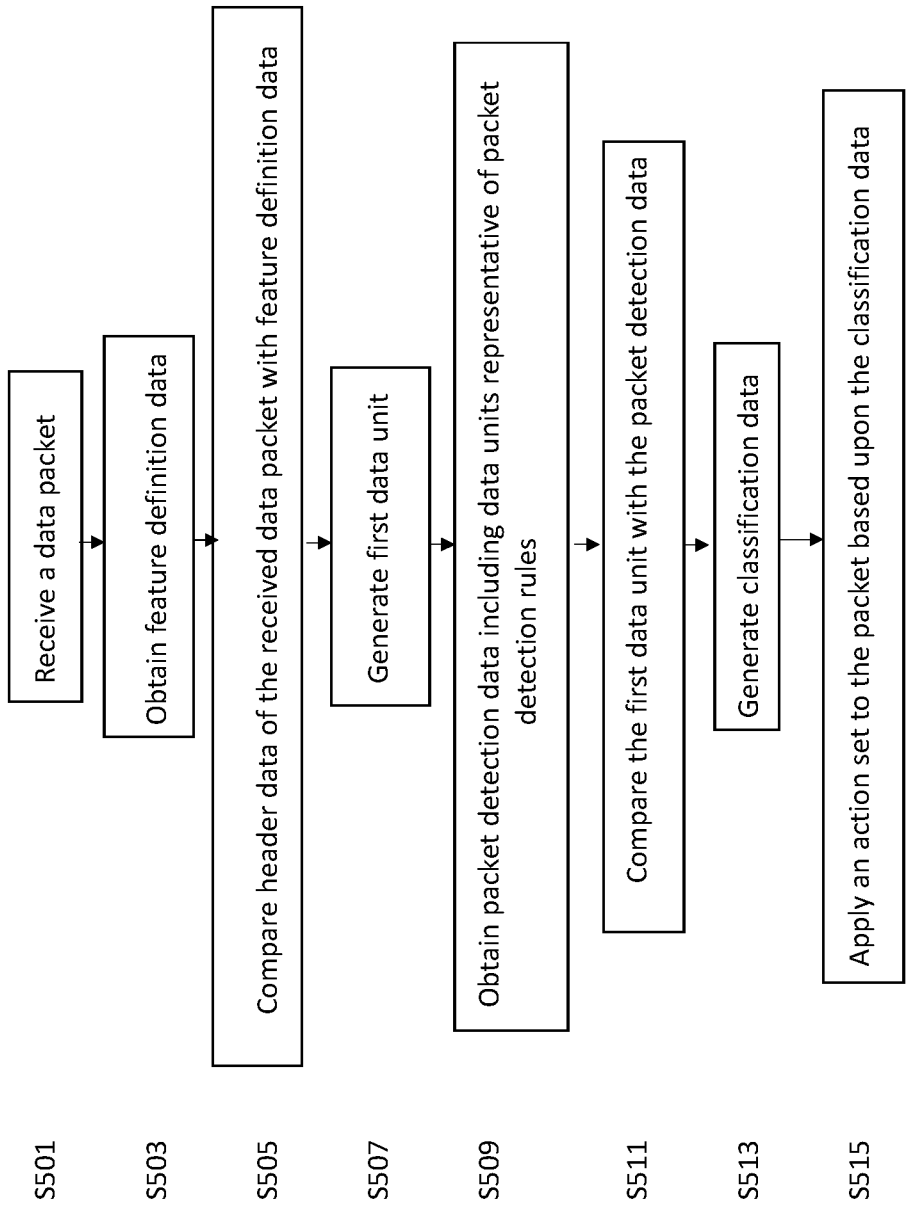
FIG. 5 is a schematic diagram showing the steps executed by the packet processor of FIG. 1 when manipulating data according to FIGS. 2 and 3.

Referring to FIG. 5, when utilized by a 5G UPF, the packet classifier 101 performs PFCP session lookup, which identifies a PFCP session to obtain the appropriate feature definition data and then performs a first comparison phase to create the first data unit 207 as described above (steps S501, S503, S505, S507) and then finds a matching PDR—e.g. one of PDR1 301, PDR2 303, PDR3 305—with highest priority using the second phase of processing described above (steps S509, S511, S513). An action set including one or more actions derived from the action data 310 (which itself is derived from Forwarding Action Rules (FARs), Buffering Action Rules (BARs), QoS Enforcement Rules (QERs) and Usage Reporting Rules (URRs) stored in the data store 103) is then applied to the packet by the packet forwarder 105 based upon the relevant identified PDR (step S515), and, depending on the action(s) applied, the packet may be output from the user plane component 401.

Examples have particular application to 5G networks, since the process is suited to the dynamic programming of PDRs to the UPF in a 5G network. As a result, the network should be able to sustain higher call set-up rates and achieve lower set-up latency than a system which uses known classifiers.

In addition, as explained above, examples have applicability to packet processing generally, since they provide array (vector) based parallelised processing of packet data, and this provides very significant performance in terms of usage of clock cycles. In particular, when the header fields have a significant number of features (e.g. ranges of values) the techniques described herein are shown to provide two to three times the throughput possible using known classifiers.

The above examples are to be understood as illustrative embodiments of the present disclosure. Further examples are envisaged. For example, a rule-based classifier as described above may be used in a PBFS (Packet-Based per Flow State) scheme where only first-in-flow packets are analyzed as described and entries are added dynamically to another classifier, of a different type, to handle mid-flow packets. The classifier used as the mid-flow classifier may be of a known type, such as a decision-tree classifier. Alternatively, a packet processing graph structure of the form described in Applicant's co-pending application GB 1813199.5 may be used as the mid-flow classifier.

It is to be understood that any part described in relation to any one example may be used alone, or in combination with other parts described, and may also be used in combination with one or more parts of any other of the examples, or any combination of any other of the examples. Furthermore, equivalents and modifications not described above may also be employed without departing from the scope of the present disclosure, which is defined in the accompanying claims.

What is claimed is:

1. A method of performing rule-based classification of data packets in a data communications network, comprising:
receiving a data packet comprising packet header data;
obtaining feature definition data representative of a plurality of packet header features;
based on a comparison of the packet header data of the received data packet with the feature definition data, generating a first bit pattern comprising a first plurality of bits derived from the comparison, each bit indicating the presence or absence of a packet header feature in the plurality of packet header features;
obtaining a second bit pattern comprising a second plurality of bits, the second bit pattern representative of a packet detection rule;
determining a rule-based classification based on a comparison of the first bit pattern with the second bit pattern; and
processing the data packet in accordance with the rule-based classification.

2. The method according to claim 1, wherein the packet detection rule is a first packet detection rule, further comprising:
obtaining a third bit pattern comprising a third plurality of bits representative of a second packet detection rule.

3. The method according to claim 2, wherein the determining the rule-based classification comprises:
duplicating the first bit pattern into one register of a processor;
loading the second and third bit patterns into another register of the processor as a vector;
wherein the rule-based classification is determined based on a comparison between the one register and the other register.

4. The method according to claim 3, further comprising:
obtaining a fourth bit pattern comprising a fourth plurality of bits representative of a third packet detection rule, and wherein the rule-based classification is determined based on a comparison comprises comparing a duplicated set of the first bit pattern with a first vector comprising the second and third bit patterns, wherein the fourth bit pattern is not included in the first vector.

5. The method according to claim 4, wherein the second, third and fourth bit patterns are associated with priority data indicative of priorities attached to each respective packet detection rule, and wherein placement of the second and third bit patterns into the first vector is determined according to the priority data.

6. The method according to claim 5, further comprising, when there is no match between the first bit pattern and the second and third bit patterns, comparing a duplicated set of the first bit pattern with a second vector comprising the fourth bit pattern.

7. The method according to claim 5, further comprising, when there is a match between the first bit pattern and at least one of the second and third bit patterns, determining the rule-based classification without comparing the first bit pattern to the fourth bit pattern.

8. The method according to claim 1, wherein generating the first bit pattern comprises extracting a value from a field of the packet header data, duplicating the value into one register of a processor, loading at least part of the feature definition data as a vector into another register of the processor, and performing a comparison between the one register and the other register.

9. The method according to claim 1, wherein the first bit pattern comprises a bit mask in which the first plurality of bits indicate presence or absence of respective packet header features.

10. The method according to claim 1, further comprising:
performing session-based classification of the received data packet to generate session classification data;
wherein the rule-based classification is based on the session classification data,
wherein the session-based classification comprises:
obtaining session detection data representative of a plurality of sessions;
loading the session detection data into a tree-structure classifier; and
performing classification of session identifier data in the packet header data using the tree-structure classifier to generate the session classification data.

11. The method according to claim 1, wherein the processing of the data packet in accordance with the rule-based classification data comprises one or more of:
dropping the received data packet;
routing the received data packet to a selected service function processor;
applying a selected Quality of Service (QoS) treatment to the received data packet; and
performing a selected differential usage reporting or charging function with respect to the received data packet.

12. The method according to claim 1, wherein the method is performed by a packet forwarding engine.

13. The method according to claim 1, wherein the method is performed by a User Plane Function (UPF) in the data communications network.

14. A non-transitory computer storage medium storing computer-readable instructions that when executed by a processor of a system, cause the system to:
receive a data packet comprising packet header data;
obtain feature definition data representative of a plurality of packet header features;
based on a comparison of the packet header data of the received data packet with the feature definition data, generate a first bit pattern comprising a first plurality of bits derived from the comparison, each bit indicating presence or absence of a packet header feature in the plurality of packet header features;
obtain a second bit pattern comprising a second plurality of bits, the second bit pattern representative of a packet detection rule;
determine a rule-based classification based on a comparison of the first bit pattern with the second bit pattern; and
process the data packet in accordance with the rule-based classification.

15. A system configured to perform rule-based classification of data packets in a data communications network, the system comprising:
one or more processors; and
a memory in communication with the one or more processors, the memory having computer-readable instructions stored thereupon that, when executed by the one or more processors, cause the system to perform operations comprising:
receiving a data packet comprising packet header data;
obtaining feature definition data representative of a plurality of packet header features;
based on a comparison of the packet header data of the received data packet with the feature definition data, generating a first bit pattern comprising a first plurality of bits derived from the comparison, each bit indicating presence or absence of a packet header feature in the plurality of packet header features;
obtaining a second bit pattern comprising a second plurality of bits, the second bit pattern representative of a packet detection rule;
determining a rule-based classification based on a comparison of the first bit pattern with the second bit pattern; and
processing the data packet in accordance with the rule-based classification.

16. The system according to claim 15, wherein the packet detection rule is a first packet detection rule, further comprising computer-readable instructions stored thereupon that, when executed by the one or more processors, cause the system to perform operations comprising:
obtaining a third bit pattern comprising a third plurality of bits representative of a second packet detection rule.

17. The system according to claim 16, wherein the determining the rule-based classification comprises:
duplicating the first bit pattern into one register of a processor;
loading the second and third bit patterns into another register of the processor as a vector;
wherein the rule-based classification is determined based on a comparison between the one register and the other register.

18. The system according to claim 17, further comprising computer-readable instructions stored thereupon that, when executed by the one or more processors, cause the system to perform operations comprising:
obtaining a fourth bit pattern comprising a fourth plurality of bits representative of a third packet detection rule, and wherein the rule-based classification is determined based on a comparison comprises comparing a duplicated set of the first bit pattern with a first vector comprising the second and third bit patterns, wherein the fourth bit pattern is not included in the first vector.

19. The system according to claim 18, wherein the second, third, and fourth bit patterns are associated with priority data indicative of priorities attached to each respective packet detection rule, and wherein placement of the second and third bit patterns into the first vector is determined according to the priority data.

20. The system according to claim 19, further comprising computer-readable instructions stored thereupon that, when executed by the one or more processors, cause the system to perform operations comprising:
when there is no match between the first bit pattern and the second and third bit patterns, comparing a duplicated set of the first bit pattern with a second vector comprising the fourth bit pattern.

* * * * *